United States Patent [19]

Fotouhi et al.

[11] Patent Number: 5,598,552
[45] Date of Patent: Jan. 28, 1997

[54] ERROR FREE DATA TRANSFERS

[75] Inventors: Bahram Fotouhi; Mir B. Ghaderi, both of Cupertino, Calif.

[73] Assignee: Sierra Semiconductor Corporation, San Jose, Calif.

[21] Appl. No.: 285,755

[22] Filed: Aug. 3, 1994

Related U.S. Application Data

[63] Continuation of Ser. No. 686,705, Apr. 17, 1991, abandoned.

[51] Int. Cl.⁶ .............................. G06F 13/42; G06F 13/372
[52] U.S. Cl. .............................. 395/494; 395/492; 395/555
[58] Field of Search ........................................... 395/427 T

[56] References Cited

U.S. PATENT DOCUMENTS

| | | | |
|---|---|---|---|
| 4,152,777 | 5/1979 | Baker | 365/15 |
| 4,181,974 | 1/1980 | Lemay et al. | 395/200.01 |
| 4,370,712 | 1/1983 | Johnson et al. | 395/425 |
| 4,390,969 | 6/1983 | Hayes | 395/550 |
| 4,509,115 | 4/1985 | Manton et al. | 395/325 |
| 4,587,609 | 5/1986 | Boudreau et al. | 395/726 |
| 4,616,338 | 10/1986 | Helen et al. | 364/200 |
| 4,858,107 | 8/1989 | Fedele | 395/425 |
| 4,868,737 | 9/1989 | Soederlund | 395/250 |
| 4,873,630 | 10/1989 | Rusterholz et al. | 395/800 |
| 4,884,234 | 11/1989 | Keys et al. | 395/425 |
| 4,977,537 | 12/1990 | Dias et al. | 395/425 |
| 5,255,381 | 10/1993 | Chinnaswamy et al. | 395/488 |
| 5,261,046 | 11/1993 | Shope et al. | 395/162 |

*Primary Examiner*—Reba I. Elmore
*Attorney, Agent, or Firm*—Burns, Doane, Swecker & Mathis LLP

[57] ABSTRACT

A novel circuit is provided which allows a storage register to load data from another register utilizing a store signal which is asynchronous to the clock signal used to store data in the first register. A novel store circuit is provided which provides a control signal in response to a store signal, which conditionally loads data into the storage register. The contents of the storage register is either maintained or overwritten, depending upon the relationship of the store signal to the clock signal.

3 Claims, 2 Drawing Sheets

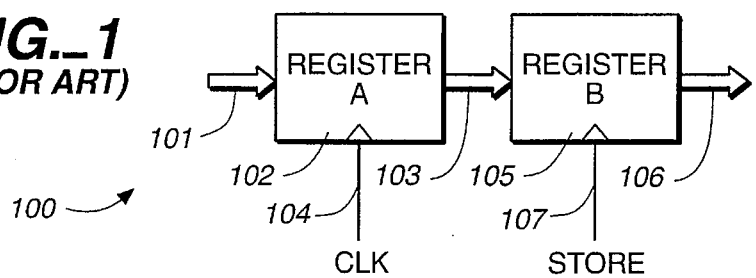
FIG._1 (PRIOR ART)
FIG._3

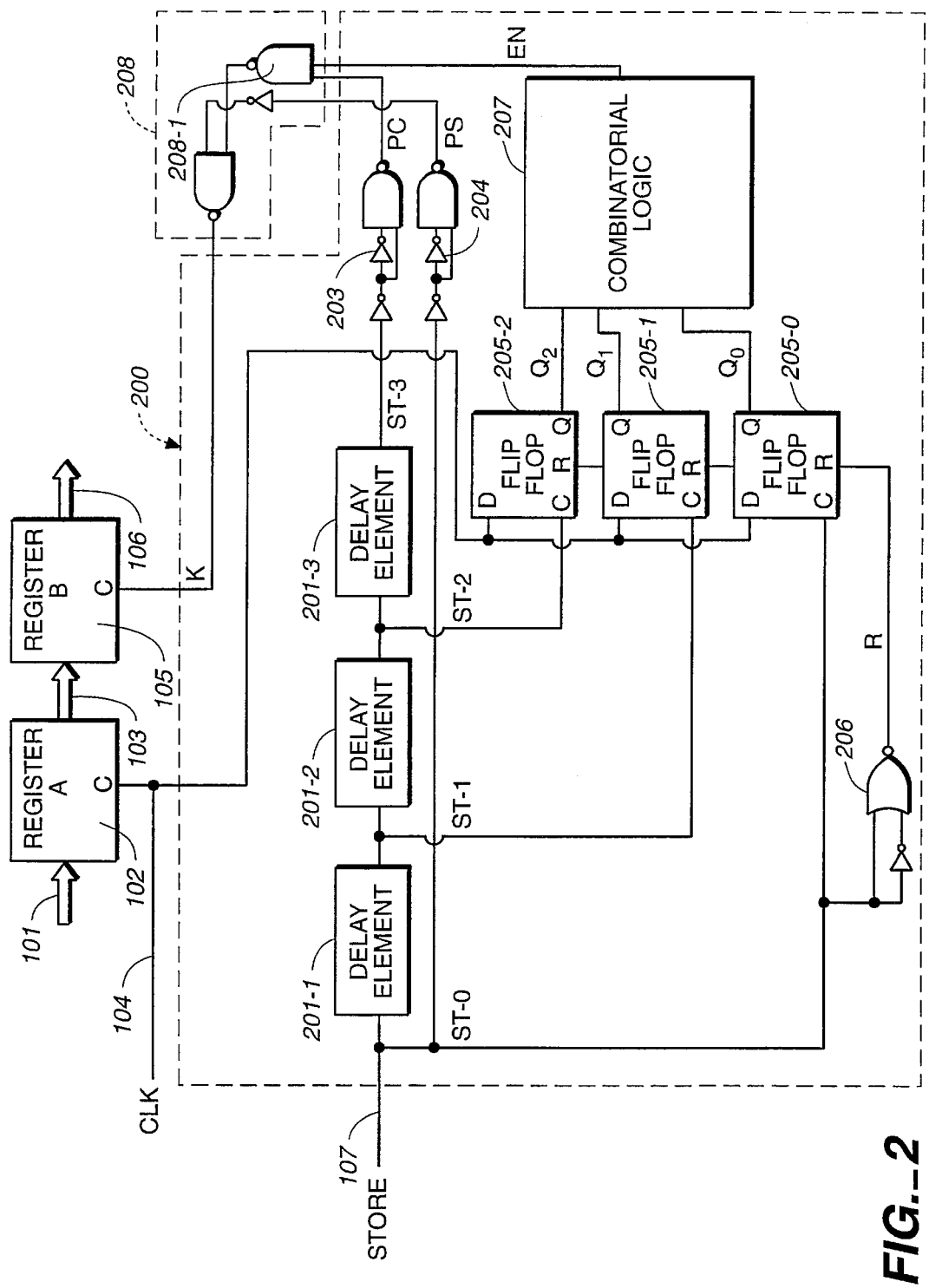
FIG._2

ERROR FREE DATA TRANSFERS

This application is a continuation of application Ser. No. 07/686,705, filed Apr. 17, 1991 now abandoned.

BACKGROUND

This invention pertains to digital circuitry, and more particularly to asynchronous digital circuitry in which data is moved from a register or storage element.

FIG. 1 is a block diagram of a typical prior art circuit which includes register 102 and register 105. Register 102 receives input data via bus 101 which is loaded into register 102 in response to the clock signal applied to clock input lead 104 of register 102. Once loaded, this data is available from register 102 on output bus 103. This data is fed from bus 103 to, for example, register 105. This data is loaded into register 105 in response to a store signal applied to the clock input lead 107 of register 105. Once loaded into register 105, the data is available on output bus 106.

A problem with the typical prior art circuit of FIG. 1 is that if the store signal applied to input lead 107 of register 105 is asynchronous to the clock signal applied to clock input lead 104 of register 102, register 105 will randomly (with respect to the clock signal applied to clock input lead 104) sample the data on data bus 103 for storage in register 105. Thus, this sampling by register 105 may occur while register 102 is being updated, during which time the output data from register 102 available on bus 103 is not valid. In this event, register 105 stores invalid data, clearly an undesirable result.

SUMMARY OF THE INVENTION

In accordance with the teachings of this invention, a novel circuit is provided which allows a register to load data from another register utilizing a store signal which is asynchronous to the clock signal used to store data in the first register. In accordance with the teachings of this invention, a novel store circuit is provided which provides a control signal in response to a store signal, which conditionally loads data into the storage register. The contents of the storage register is either maintained or overwritten, depending upon the relationship of the store signal to the clock signal.

BRIEF DESCRIPTION OF THE DRAWINGS

FIG. 1 is a block diagram of a typical prior art data transfer circuit;

FIG. 2 is a schematic diagram of one embodiment of a circuit constructed in accordance with the teachings of this invention; and FIG. 3 is a set of timing waveforms depicting the operation of the embodiment of FIG. 2.

DETAILED DESCRIPTION

FIG. 2 is a schematic diagram of one embodiment of a circuit constructed in accordance with teachings of this invention, which includes register 102 and register 105, as well as a novel storage control circuitry 200 constructed in accordance with the teachings of this invention. The purpose of storage control circuitry 200 is to insure that the data stored within register 105 is valid data, regardless of the relationship between the store signal received on lead 107 and the clock signal which is received on lead 104. This is particularly important since the store signal is asynchronous to the clock signal.

On every rising edge of the store signal, a short pulse PS is generated by pulse generator circuit 204. This pulse PS serves to transfer the contents of storage register 102 into storage register 105. This data which is thus stored in storage register 105 is either maintained or overwritten if it is determined that this data might not be valid.

Delay elements 201-1 through 201-3 serve to provide a plurality of delayed storage signals St-1 through St-3, respectively, with St-0 referring to the undelayed store signal received on lead 107. Storage signals St-0 through St-2 are applied to flip-flops 205-0 through 205-2 in order to sample clock signal 104 at three distinct points of time with reference to the store signal, thus providing three output signals Q-0, Q-1, and Q-2 to combinatorial logic circuit 207. These signals are decoded by combinatorial logic 207 to generate enable signal EN. Enable signal EN is a logical one if the value of Q-0, Q-1, Q-2 equals either 011 or 111. Conversely, the value of enable signal EN is a logical zero for other combinations of Q-0, Q-1, Q-2. When enable signal EN is a logical one, NAND gate 208-1 within subcircuit 208 is enabled, causing the PC signal following the PS pulse to again cause register 105 to store data available on data bus 103. This is necessary because, with a high enable signal EN, it cannot be guaranteed that the data previously stored in response to the PS signal from pulse generator 204 was valid due to the relationship of the store signal which generated the PS signal with respect to the clock signal. In other words, it is likely that the PS signal generated in response to the store signal caused register 105 to store the data available from register 102 on output bus 103 during a time when the clock signal applied to lead 104 was causing register 102 to be updated, thus providing potentially invalid data to register 105.

Conversely, when enable signal EN is low, NAND gate 208-1 is disabled, and signal PC from pulse generator 203 is not gated through to register 105, and the valid contents which was stored in register 105 in response to the PS signal remains stored in register 105.

This operations of the embodiment of FIG. 2 is also described with reference to the timing diagrams of FIG. 3. It is necessary to determine whether the rising edge of clock (at $t_r$) occurs in the vicinity of $t_o$, at which time the PS pulse is generated by pulse generator 204 in order to update the contents in register 105. If $$t_o + t_e \leq t_r \leq t_1 - t_e,$$

where $t_e$ equals the setup and hold times of flip-flops 205-0 through 205-2 (which are assumed to be equal), then the state of flip-flops 205-0 through 205-2 will either be Q-0, Q-1, Q-2 equals 011 or 111. This indicates that the data transfer from register 102 to register 105 in response to the PS pulse generated by pulse generator 204 at to was possibly corrupted in that this data transfer occurred at or very near the rising edge of the clock signal which is used to update the contents of register 102. In this event, combinatorial logic circuit 207 causes enable signal EN to go high, enabling NAND gate 208-1 to provide pulse PC from pulse generator 203 to cause a second data transfer from register 102 to register 105 at $t_3$, which occurs at a time delayed from $t_o$, with delays caused by delay element 201-1 through 201-3. In this case, the second writing of data from register 102 to register 105 ensures that the data thus transferred is valid data.

To ensure that data is not read from register 105 during the period in which corrupt data may have been transferred from register 102 to register 105, the contents of register 105 is not read until the falling edge of signal ST-3.

For proper operation, the delay time $t_d$ provided by each of delay elements 201-1 through 201-3 should be longer than $t_e$ in order to allow flip-flops 205-0 through 205-2 and the various logic gates to respond and settle properly.

The storage control circuit 200 is reset on the falling edge of the store signal ST-0 applied to store lead 107, and is thus readied for the next rising edge of the store signal ST-0.

Accordingly, in accordance with the teachings of this invention a novel circuit is provided which ensures that data transferred from a first register to a second register in an asynchronous manner is made such that the data transferred is guaranteed to be valid. This is achieved in a very straight forward and inexpensive manner, thus solving a significant problem of the prior art. In accordance with the teachings of this invention, any suitable delay elements may be used, including well known delay lines, shift registers or one or more gate delays. Furthermore, while the embodiment described above describes the operation of this embodiment with respect to the use of registers, teachings of this invention apply equally well to any such storage system wherein the output data from a first storage device is not valid during a period of time during which the contents of that storage element is being updated. Similarly, various types of pulse generators can be used, as well as various types of logical elements in order to provide the control signals as taught in this invention.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. An apparatus comprising:

a first storage register having a data input port and a data output port and being clocked by a first clock signal;

a transfer signal occurring asynchronously with respect to the first clock signal;

transfer control means responsive to the first clock signal and the transfer signal for producing a second clock signal; and a second storage register having a data input port connected to the data output port of the first storage register and a data output port and being clocked by the second clock signal;

wherein said transfer control means:

produces a single occurrence of the second clock signal in response to a single occurrence of the transfer signal—if the transfer signal and a temporally-nearest occurrence of the first clock signal are separated by at least a predetermined amount of time; and produces a delayed occurrence of the second clock signal in response to, and delayed with respect to, a single occurrence of the transfer signal—if the transfer signal and a temporally-nearest occurrence of the first clock signal are not separated by at least said predetermined amount of time.

2. The apparatus of claim 1, wherein said transfer control means produces two successive occurrences of the second clock signal in response to a single occurrence of the transfer signal if the transfer signal and a temporally-nearest occurrence of the first clock signal are not separated by at least a predetermined amount of time.

3. The apparatus of claim 2, wherein said transfer control means comprises:

a plurality of delay means for providing a plurality of delayed versions of said transfer signal;

means for generating a second occurrence of said second clock signal in response to at least one of said delayed versions of the transfer signal;

means for determining if said transfer signal occurs within a predetermined time from said first clock signal; and means for gating said second occurrence of said second clock signal such that said second occurrence of said second clock signal is applied to said second storage register only when said transfer signal occurs within said predetermined time from said first clock signal.

\* \* \* \* \*